Dec. 17, 1968 A. G. BODINE 3,416,322
SONIC METHOD AND APPARATUS FOR IMPLANTING
UNDERGROUND CONCRETE WALLS
Filed Nov. 14, 1966 7 Sheets-Sheet 1

INVENTOR.
Albert G. Bodine
BY
Attorney

United States Patent Office 3,416,322
Patented Dec. 17, 1968

3,416,322
SONIC METHOD AND APPARATUS FOR IMPLANTING UNDERGROUND CONCRETE WALLS
Albert G. Bodine, Los Angeles, Calif.
(7877 Woodley Ave., Van Nuys, Calif. 91406)
Filed Nov. 14, 1966, Ser. No. 594,153
12 Claims. (Cl. 61—35)

This invention deals generally with, and provides processes and apparatus for, the construction of underground concrete walls through use of resonant sonic vibrations for underground placement of forms for such walls.

It is often desirable to place a vertical wall in an underground situation, and the present invention provides for so doing expeditiously and economically, and without first making preliminary excavations by conventional trenching methods, and without the usual hand building of forms for the concrete. The invention is useful for construction of vertical foundation walls, basements, subways, walls to dike off underground water, and the like. It is the general object of the invention to accomplish and facilitate such operations by use of certain sonic vibration processes and equipment.

The broad invention has a number of specific variants, and a number of these will be discussed in detail hereinafter.

One typical practice of the invention involves the driving into the earth, preferably by sonic pile driver procedures (see my Patent No. 2,975,846), of a row of special vertical beams or pillars, e.g., H-beams, correlated with driving into the earth by sonic procedures, into position between these beams, of large box-like forms which are used in the pouring, placement or construction of concrete wall sections or slabs. These wall sections or slabs, together with the pillars, comprise the final wall. The H-beams are generally driven to depths somewhat greater than the planned lower level of the wall sections, and the wall sections and beams or pillars are preferably configured to interfit, edge to edge, with one another so as to provide a continuous wall.

A primary unique concept of the invention is the driving of large, box-like wall forms into the ground by resonant sonic vibration procedures, making use of special properties of the earth which cause these large forms to be readily accepted into the earth under the special conditions of resonant sonic vibration. The concept here is that a large elastic (e.g., steel), generally box-like hollow structural form or mold box for a concrete, vertically elongated wall section, or slab, the form having vertical sides and edges and a relatively large horizontal downwardly facing bottom area, with sufficient width to form a thick underground foundation wall, for example, will quite rapidly penetrate the ground if resonant elastic vibrations are set up therein, or if it is a part of a resonating system which includes such structure as an elesatically vibratory component in a resonant acoustic circuit. The type of elastic resonant vibration here spoken of is to be distinguished from a substantially bodily vibrating member reciprocating with its lower end moving alternately up and down against the earth, with the ground itself supplying springiness, such that, when correlated with the lumped mass characteristic of the member, there may be a sort of bodily "bouncing" resonance, or similar frequency response by the earth material itself. Such action is precisely analogous to a boy bouncing on a spring mattress, and has no relation to the phenomenon of the invention. On the contrary, the present process is concerned with an elastic vibration action at a frequency at which the form structure itself undergoes resonant elastic vibration (i.e. with parts thereof, particularly the wide, flat walls thereof, undergoing cyclic elastic deformation movements, in a generally complex standing wave vibration pattern) with the consequence that the form structure, even though of large dimensions, buries itself rapidly in the earth. How this becomes possible will be explained further hereinafter.

In this first illustrative example, the box structure functions as a "form," by forming in the ground a wall slab space of predetermined dimensions and location. Concrete can then be filled into the sonically buried form and the form can then be extracted while the wet concrete is either dumped or extruded therefrom to fill the slab space. Preferably, sonic resonant vibrations are again applied to the form to facilitate extraction thereof, leaving the concrete in place in the ground as a solid wall slab. A feature of the invention is to withdraw the box form gradually by sonic action, while ejecting and extruding the wet concrete from the form in a condition of sonic agitation resulting from the resonant vibration, so that the concrete is cyclically compacted into the form space and a concrete wall of high structural integrity thus cast in place within the ground.

A modification of this basic process is to initially enclose a precast concrete wall section or slab within the box-like form structure, and to drive the two simultaneously down into the ground by sonic means, as aforesaid. The box structure can then easily be extracted by simultaneously vibrating it while exerting an upward pull thereon.

As a further variation, the concrete precast wall section or slab can be installed into the box form after the latter has been sonically driven into the ground. The hollow box form is then extracted by applying sonic action thereto together with an upward pull, and a novel and highly advantageous feature in this case, and other cases as well, is that the sonic action so applied to the box causes the latter, when it is in a resonating condition, to act as a particularly effective compacting member. In other words, soil caving in against the precast concrete wall section member is compacted tightly thereagainst by the receding lower edge of the box structure as it is resonated and brought up from the ground. The result then is that the precast concrete wall member is tightly embedded in good solid manner within the ground.

A further concept of the invention is to install large elongated concrete wall members in the ground in close edgewise relation so as to provide a continuous underground wall, and to fill the joints between wall sections with media designed to seal these joints, and in most cases to support the sections in their vertically driven positions, for example, such as by use of vertically driven beams. These beams may be driven first, and then utilized to guide the edges of the wall slabs into position. Thus the subsequent sections of the wall as they are driven into the ground are arranged in sealing and/or supporting relationship with the preceding section, or with vertical beam members driven therebetween. By introduction of grout, a good concrete bond can be formed between the components. The grout is preferably introduced with aid of sonic vibration agitation, so as to drive it forcibly and compactly into the regions to be sealed or grouted. Clearly, the grout can be so installed in between the vertical edges of adjacent wall sections whether or not vertically driven beam sections are used at the joints. In all cases, the components of the wall at the joints between wall sections can be sealed and grouted to one another by using sonic introduction techniques to drive the dirt out and to pack the grout into the joints, so that the final result is a continuous wall without remaining open joints or water leakage paths therethrough.

Another important form of my invention uses a sonically activated elastically vibratory resonant form which is dragged generally horizontally through the earth like a deep plow. The sonic action causes this "sonic form" to progress through the ground in a forward direction, opening a trench as it does so, and wet concrete is simultaneously introduced through this form, or just in back of same, so that a continuous wall can be cast in this way. While this concrete casting process is going on, various reinforcing steels can be introduced into the wet concrete immediately within the form as it moves forward, or just behind the form. The steel members can be advantageously sonically driven into the concrete behind the form, before the concrete sets up too hard. Sonic driving is conceivably possible after some set has been taken, but the most practical procedure is to introduce the steel prior to hardening.

A most important concept of the invention is that the sonic elastically vibratory action, at resonance, with the elastically vibratory member in coupling engagement with the soil to be displaced or parted as the case may be, finds the soil to act at first quite as a very largely resistive impedance, with a reactance much lower than would be anticipated. Avoiding any postulation for this performance for the time being, I find that the soil is highly fluidized by the application thereto of the sonic energy delivered to it from the wide walls of the sonically vibrating form with the consequence that the soil tends readily to flow and move, parting to permit introduction of large flat-sided rectangular members such as boxes and the like, so that wall forms contemplated by the invention can be readily installed in the ground. The wide walls act somewhat like the sounding board of a piano and are thus well coupled acoustically to the earth.

The invention in all of its forms and applications thus employs sonic elastic virbations at resonance in an elastic wall form or box structure. The earth-engaging surface of this form or box structure, particularly the wide walls thereof, acts as a sonic wave or vibration radiator. This radiator in combination with the later described resonant sonic driving means behind it operates automatically in a manner to accommodate or adjust to certain varying conditions in the earth medium as the form or box structure is moved therethrough. Thus, the earth medium may comprise soil layers of different types or constituents, of different hardness and/or compaction, or different moisture content, and with widely differing occurrence of rock material, varying from sand and small gravel, which are easily displaced, to rock media of such constituency as permits penetration by the box structure to be driven, and finally to occasionally fairly sizable boulders.

These varying conditions present unpredictable impedances of two kinds: The first is resistive, or power-consuming, and corresponds with resistance in an electrical system, or friction or other energy dissipation in mechanical systems. In the present system, this resistive or power-consuming factor predominates, for reasons to be presently further described, and varies widely. The second is reactive, or non-power-consuming, corresponding, by analogy to electrical alternating-current systems, to the algebraic difference between inductive reactance and capacitive reactance, and by analogy to ordinary mechanical vibration systems, to the algebraic difference between mass reactance and elastic compliance reactance. The resultant reactive impedance combines vectorially with the resistance factor or component to form a resultant load impedance. As mentioned earlier, this load impedance is variable, but largely resistive.

The box structure or form, and the earth material under it, comprise two impedances in series in an acoustic circuit, and both of these impedances are, in the practice of the invention, very largely resistive in character, as just mentioned. In the case of the box structure, the elastic vibration set up therein is maintained at a resonant frequency of the box structure and the load, the latter of course comprising the earth material sonically activated by the vibrating box structure. Under these conditions of resonance, the reactance and elastic compliance reactance of the box structure cancel one another, or nearly so. The impedance of the box is thus largely, or sometimes, and ideally, purely of a resistive character. This has the incidental but highly important advantage that force otherwise consumed and wasted in vibrating the relatively massive box is conserved.

Directing attention now to the earth material which is being parted by the sonic activity of the resonating box structure, a curious but highly beneficial action is apparent, in that the load adjacent the wide walls also exhibits a primarily resistive impedance. Turning attention for the moment to the case of a member simply bodily vibrated against the earth, the earth must present a vibratory circuit response to such member if the member is to so vibrate in a manner which I have already referred to herein as "bodily bouncing vibration." That is to say, the earth material must present to the vibrated member both an elastic compliance reactance and a mass reactance which results in the mass and compliance reactance of the circuit or system being substantially equal to one another at the vibration frequency if there is to be resonance. A portion of bodily vibrating earth material in this circumstance functions inherently as a mass reactive impedance in the acoustic circuit. This must follow, since the vibrated penetration member, vibrating virtually only bodily, has no effective or useful elastic type of vibration, and therefore no effective elastic compliance reactance. Also, since the vibratory member or structure and the body of earth material vibrating bodily therewith, must vibrate in cooperation with an elastic compliance reactance, this elastic compliance must necessarily be supplied by the earth, it having been stipulated that in the case assumed, no elastic compliance reactance worth mentioning is provided by the bodily vibratory structure. The prior art picture, then, is that of a substantially purely bodily vibratory member in engagement with the earth, vibrating substantially without elastic vibratory deformation within itself, with a plug or mass of the earth about the structure vibrating unitarily and substantially bodily with the structure, and finally, with this largely bodily vibratory portion of earth that moves with the structure being, in effect, compliantly related to and thus acoustically coupled to the surrounding earth material. In simple language, there is a "springiness" effect between the surrounding earth material and the plug or mass of earth material that moves generally bodily with the structure being driven. Under these conditions, the earth presents the above described response characteristics, such as accounts for the bodily bouncing type of vibration at a natural or resonant frequency. To accomplish this action, enough earth mass must vibrate bodily with the penetrating structure so that the total vibratory mass reactance substantially equals the compliance reactance presented by the earth. Thus the earth in such case presents its circuit response throughout a substantial volume of the earth surrounding the vibratory structure, with the earthen grains in each bodily vibratory region of the earth vibrating substantially in unison, all moving in substantially the same phase and direction, as well as with substantially the same amplitude. This then tends to result in the earth material continuing to behave as a fairly coherent mass, which is difficult of penetration by the structure desired to be inserted into the earth.

In my resonant sonic system, on the other hand, all of the necessary responses for resonant vibratory activity are embodied within the structure itself (i.e. exclusive of the earth), entirely independently of the mass and elastic compliance reactance factors which are inherently involved in the type of bodily vibratory resonance discussed immediately above. In other words, the present large-dimension system is a complete resonant circuit, without dependence upon the earth for reactance phenomena. All requirements of mass and elastic compliance reactances are thus fully met within the large structure itself, and the wide box-like structure is designed, by acoustic techniques known in the art, to vibrate elastically at resonance at a predetermined vibration frequency which can be conveniently generated. To repeat, under the conditions herein practiced, no environmental reactive impedance response is required for resonant vibration of the structure to be inserted into the earth. The earth then presents primarily only a resistive impedance. Under these critical conditions, the earth grains tend to vibrate randomly, being fully random as regards relative vibration between the grains. These grains can vibrate randomly relative to each other as regards direction, phase, and amplitude. Thus there is considerable relative motion and freedom of mobility between separate grains, with the result that they can be displaced and compacted quite easily relative to each other. Accordingly, with a moderate amount of bias, such as a force pressing the penetration structure downward, or with utilization simply of the downward force owing to the typically large mass of the structure, the grains can be made to work into more intimate contact, tumbling about and finally fitting closely in a compact mass, with the various odd-shaped grains tending to position themselves together for maximum compaction, with the smaller grains fitting between larger grains. The sonic activation thus makes possible a very high degree of mobility and resulting compaction, so that a large volume penetration member, i.e. those with large downwardly projected area, can be made to progress rapidly into the earth.

A further problem is presented, however, in that, where the purpose is to build an underground wall, the box structure form members must in general be driven straight downwardly into predetermined position, irrespective of problem conditions that are encountered, such as varying conditions in the soil structure, for example, strata of different composition, moisture, rock, including occasionally fair sized boulders, and the like. Accordingly, the practice of the invention preferably further incorporates certain equipment and techniques which for many situations are deemed by me to be critically vital to the success of the operation. Thus, as the vibratory penetrating structure travels downward into the earth, the impedance presented to it by each of the different kinds of soil conditions encountered varies accordingly. It has been explained that under the conditions of the invention, the impedance presented by the earth material is largely resistive impedance, but this resistive impedance can change quantitatively through relatively large ranges in the downward progression of the penetrating structure. Also, however, what reactive impedance is presented to the downwardly penetrating structure also varies from point to point in the downward travel of the structure. To accomplish the relatively ambitious aim of straight downward installation of a large structural wall form, the downward vibratory driving operation must be automatically responsive to the various conditions of impedance as they are encountered, in such a way as to assure a continuation of steady downward drive, largely irrespective of earth materials encountered. The invention uses for this purpose a vibration generating means of a particular type involving a certain orbital-mass oscillator mechanism which inherently possesses the necessary automatic accommodation to variations in impedance of the earth material to be penetrated, particularly with the large "drumming" walls of the box-form.

Orbital-mass vibration generators or vibrators are known, and a number of forms thereof have been disclosed in my prior patents, such as Nos. 2,960,314 and 2,975,846, and in my copending applications Ser. Nos. 402,474 and 573,371. They may take any of various mechanical forms, one of the simplest and best of which involves a roller mass rolling around in a bearing, so that the mass generates a centrifugal force which is reactively opposed by the bearing. The bearing is on a housing, which in response to the centrifugal force so generated, exerts a periodic inertial force on whatever may support it or be coupled thereto. For the present, such housing is acoustically coupled to the top of the box-form structure to be inserted into the earth, in typical manner as later to be further explained. The system is to be analyzed as a discrete resonant acoustic circuit, of which two components are the aforementioned vibration generator or oscillator of the orbital-mass type, and the elastically vibratory box-form structure, characterized by distributed and/or lumped mass and elastic compliance reactances, and driven by the oscillator at a frequency so as to function as a resonator. The third component of the circuit is the coupled-in "load," made up of the earth material being penetrated, and which acts as a largely resistive impedance which is acted upon, and in turn back-reacts upon, the oscillator-resonator combination.

The oscillator is equipped with a driving means or power source, generally in the nature of a motor of some sort, either electrical, pneumatic, hydraulic, internal combustion engine, or any other found suitable. It is important that this driving motor for the oscillator be powered so as to tend to operate at the resonant frequency of the acoustic circuit, and by having the driving motor tend normally to drive the oscillator at a frequency just under that for peak resonance, a number of additional important advantages are gained, particularly when using a driving motor which has a characteristic of inverse speed responsiveness to loading torque imposed upon it by the oscillator and the balance of the acoustic system. These advantages will be spoken of more particularly hereinafter. The driving motor, oscillator, resonator, and the variable impedance load constituted by the earth material which must be parted by the box-form structure resonator make up a discrete "acoustic circuit," as indicated above.

Acoustically speaking, the impedance of the resonantly vibratory resonator, i.e. the box-form structure, or any vibratory portion of the acoustic circuit thereof, such as large walls with lateral components of vibration, is a complex quantity proportional at any point within or along the resonantly vibratory box structure to the ratio of force to vibratory velocity. The impedance of the load depends, in accordance with basic theory, upon the vector resultant of the reactances and resistances of the load. This impedance, and the optimum phase angle, power factor and frequency for desired resonant performance, with maximized power delivery to the load, depends upon the magnitudes of these parameters at any particular instant, and can and do vary from instant to instant. The orbital-mass oscillator accommodates automatically and instantaneously in response to these variations in impedance, including change of phase angle of its orbiting mass relative to the motion of the vibrating resonator, with accompanying change of power factor, and/or frequency, assuring thereby effective and sustained delivery of large sonic energy to the load, such as is highly important to straight driving of the form structure into a closely predetermined position, irrespective of the described variations in impedance.

The orbital-mass oscillator adjusts its output frequency to maintain resonance with changes in impedance of the system, and thus, in the face of changes in the effective mass and compliance presented by the load, the system automatically adjusts its frequency to maintain itself in optimum resonant operation. This occurs by virtue of a resonant frequency "lock-in" characteristic of the orbital-mass generator. As mentioned hereinabove, in order to obtain optimal performance, the orbital-mass oscillator and its drive motor are dimensioned and designed so that, with the drive effort properly adjusted, the oscillator will tend to lock in for operation at a frequency just on the low side of that for peak resonance.

The oscillator then automatically changes its frequency and also its phase angle and therefore its power factor to correspond with changes in both the resistive and reactive components of the load impedance comprised of the earth material as the box-form structure penetrates downward. At the same time, assuming a drive means powered to establish operation in the range of resonance, and just below the frequency for peak resonance, and assuming also a drive means that has the characteristic of inverse speed responsiveness to load, the drive effort can readily be adjusted so that the system locks in, as already mentioned, at just below the resonant frequency of the circuit, inclusive of the load. An excellent frequency stability is thereby established.

The orbital-mass oscillator as described, coupled to a resonating box-form structure, affords a very powerful vibratory system. Such a system, moreover, can be readily designed with sufficient elastic compliance reactance to counteract the mass reactance of the relatively heavy resonator structure and oscillator housing at the resonant operating frequency, and thus virtually cancel out force-wasting mass blocking effects. It is further a definite advantage that the elastic compliance reactance in such a system can readily be made sufficiently large to afford resonant magnification of vibratory amplitudes in the system, and to provide also a large energy storage property (often designated Q). The system also has a surprising frequency stabilizing feedback effect from the resonator to the oscillator, provided that the oscillator be designed to deliver a cyclic impulse properly related to the reactance and resistance of the resonator and of the load, so that the oscillator and resonator tend to maintain a frequency just below that for peak resonance, as explained above, and provided further that I drive the oscillator of this combination with a characteristic of inverse speed responsiveness to load. The oscillator then both locks in at such frequency, and automatically adjusts its phase angle to the load resistance. The frequency adjusts to the load reactance. An ideal acoustic system for transmitting large sonic energy to the earth material being penetrated is thus achieved. The system is so powerful and so steady in performance, in fact, that boulders encountered by the lower ends of the walls of the box-form structure, and vibrated thereby, simply move laterally aside, and have the effect only of temporarily slowing down the rate of penetration. The form structure is not thereby materially deflected laterally, and continues downward to its pretermined position for the proper construction of the projected wall.

The box-form structure designed for forming an underground wall section can thus be expeditiously and accurately driven downward through the soil to the predetermined location of the wall by the sonic system referred to hereinabove. The box structure can then be used as a form for receiving concrete, and the box structure can then be subsequently extracted, with the aid of sonic vibrations as applied during introduction, with the concrete discharge via a vent in the bottom of the box, so as to leave a formed wall structure or section in place in the ground. The sonic action of the wide walls of the box thus allows the extraction of the box form, while ejecting and extruding the concrete to the accompaniment of sonic vibration and agitation, so that a very compact concrete member is thus formed and cast in place within the ground, all in good alignment with adjacent structure.

A variation of the process is to install the box-like form as before, and then to introduce a precast concrete wall section therein. Thereafter, the box form can be extracted again, preferably with use of sonic vibration to facilitate removal. As a still further variant, a concrete precast wall section can be installed within the box form above ground, and can then travel down with the box while the latter is being driven sonically into the ground. A unique feature of the invention is that, in all these cases, the sonic vibratory action makes of the box a very effective compacting member as the latter is resonated and simultaneously extracted from the ground. In other words, soil caving in against the concrete is compacted tightly thereagainst by the sonic action against the soil by the receding lower edge of the box form as the latter is resonated and brought up from the ground. The result then is that the cast wall is tightly engaged in the ground and in good solid location therein.

The important concept is that by employing proper sonic technique for driving these very large elongated form members, they can be driven into the ground in close-edged engagement so that a continuous wall can be made thereof without having large open joints therebetween. In some cases, in accordance with one further form of the invention, pile members, such as H-section piles, are driven into the ground at the joints between successive wall sections, and these help in guiding the form and subsequently in forming good closed joints therebetween. The joints between wall sections can also be further closed, and even sealed, by installing grout between adjoining vertical edges of successive concrete wall sections, or in conjunction with the aforementioned piles often used at the joints. Thus, the concrete wall sections can be sealed and grouted to each other, and this grout drives the dirt out and becomes sonically packed between the edges of the walls, such that the wall becomes in effect a monolithic structure.

It will be understood at this time that the invention is useful for construction of underground vertical foundation walls, in the construction of basements, subways, and the like, particularly where a wall can be installed practically totally in the earth, and the earth subsequently removed on one side thereof, leaving the installed wall to stand as a retaining wall.

To summarize certain of the acoustic concepts referred to hereinabove, a sonic resonant system comprising an elastically vibratory resonator member in combination with an orbiting-mass oscillator or vibration generator is employed in my invention. This orbiting-mass oscillator has the ability to adjust its input power and phase to the resonant system so as to accommodate changes in the work load, including changes in either or both the reactive impedance and the resistive impedance. This is a very desirable feature in that the oscillator "hangs on" to the load even as the load changes.

It is important to note that this unique advantage of the orbiting-mass oscillator accrues from the combination thereof with the acoustic resonant circuit, so as to comprise a complete acoustic circuit. In other words, the orbiting-mass oscillator is matched up to the resonant part of its system, and the combined system is matched up to the acoustic load, or the job to be accomplished. One manifestation of this proper matching is a characteristic whereby the orbiting-mass oscillator tends to "lock in" to the resonant frequency of the resonant part of the system.

The combined system has a unique performance which is exhibited in the form of a greater effectiveness and particularly greater persistence in a sustained sonic action as the work process proceeds or goes through phases and changes of conditions. The orbiting-mass oscillator, in this matched-up arrangement, is able to hang on to the load and continue to develop power as the sonic energy absorbing environment changes with the variations in sonic energy absorption by the load. The orbiting-mass oscillator automatically changes its phase angle, and therefore its power factor, with these changes in the resistive impedance of the load.

A further important characteristic which tends to make the orbiting-mass oscillator hang on to the load and continue the development of effective power, is that it also accommodates for any changes in the reactive impedance of the acoustic environment while the work process continues. For example, if the load tends to add either inductance or capacitance to the sonic system, then the orbiting-mass oscillator will accommodate accordingly. Very often this is accommodated by an automatic shift in frequency of operation of the orbiting-mass oscillator by virtue of an automatic feedback of torque to the energy source which drives the orbiting-mass oscillator. In other words, if the reactive impedance of the load changes this automatically causes a shift in the resonant response of the resonant circuit portion of the complete sonic system. This in turn causes a shift in the frequency of the orbiting-mass oscillator for a given torque load provided by the power source which drives the orbiting-mass oscillator.

The invention will be further understood from the following detailed description of several somewhat divergent illustrative applications thereof, reference for this purpose being had to the accompanying drawings, wherein:

FIG. 13 is a view generally similar to a portion of FIG. 6, but showing a modification;

FIG. 14 is a view similar to FIG. 13, but showing a subsequent position in the carrying out of the process;

FIG. 15 is a section taken on line 15—15 of FIG. 14, but prior to the grout fill-in operation;

FIG. 16 is a view similar to FIG. 15, but after grout fill-in;

FIG. 19 is a view similar to a portion of FIG. 18, but showing an H-beam driven into position;

FIG. 20 is a view similar to FIG. 19, but showing the addition of grout in the joint between wall sections;

Figure 1:
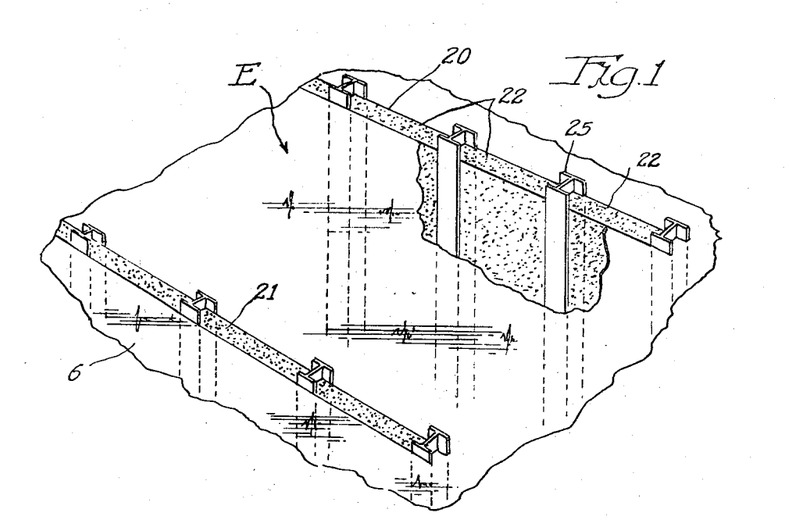
FIG. 1 is a fragmentary perspective view showing the construction of a pair of parallel concrete walls implanted in the ground by the process of the invention, and showing an excavation having been made therebetween.
Figure 2:
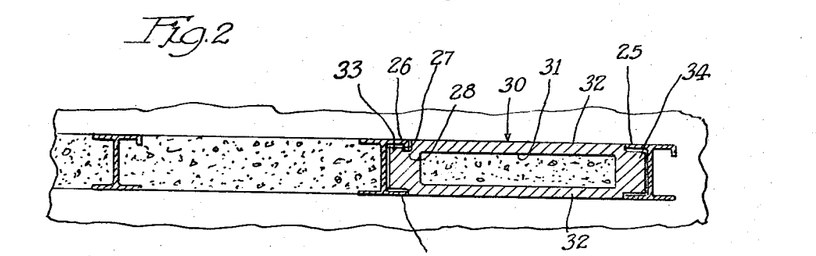
FIG. 2 is a section taken in accordance with line 2—2 of FIG. 7.

Reference is first directed to FIGS. 1 and 2 of the embodiment of FIGS. 1–12, wherein numerals 20 and 21 designate two parallel walls formed in concrete, which have been installed in the ground, the surface of which is designated generally at G, and, as will be seen, the space between these walls has been excavated, as represented at E, with the two walls 20 and 21 thus standing as retaining walls bordering the excavated space. In the embodiment of FIG. 1, the walls 20 and 21 are each made up of concrete wall slabs or sections 22, generally flat, rectangular, and vertically extended in form, and in this case, the joints between successive slabs or sections 22 contain H-beam pillars or piles such as 25, with the flanges 26 of the H-beams in this case parallel to the walls, and edge portions of the wall slabs received in the channel spaces between these flanges, as clearly illustrated in FIG. 1.

Figure 6:
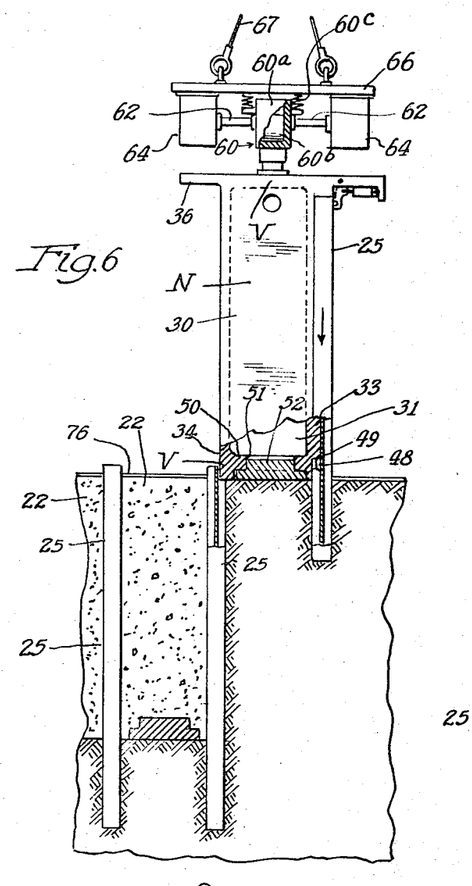
FIG. 6 is a view partly in elevation and partly in section, showing an underground wall under construction, and showing equipment in accordance with the invention for the construction of such wall.

As more clearly shown in FIG. 6, in the left-hand portion thereof, wall slabs such as 22 have been installed vertically in the ground, to a bottom level designated at L, while the piles 25 have been driven substantially deeper into the ground. Thus, for example, the aforementioned excavation may be carried down to the level L, to the bottom level of the wall sections 22, with the piles 25 then driven a number of feet deeper into the earth. Alternatively, of course, the excavation E, such as mentioned heretofore, can be carried down to a level at any desired height above the lower ends of the wall slabs 22, or in the case of the construction of a single wall, for use, for example, simply to dike off against water, there may not be any such excavation as mentioned above, and the situation may be the simple one of a concrete wall implanted in the earth, with the earth material compacted against it on both its surfaces.

Figure 8:
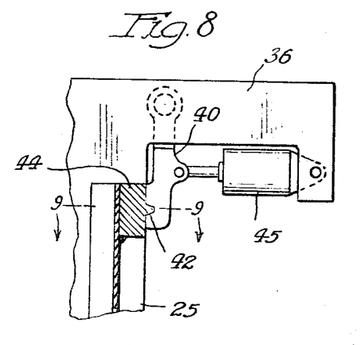
FIG. 8 is a fragmentary view, partially in section, and being an enlargement of a portion of FIG. 6.
Figure 9:
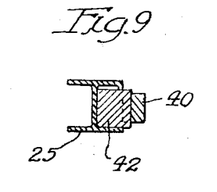
FIG. 9 is a section taken on line 9—9 of FIG. 8.
Figure 10:
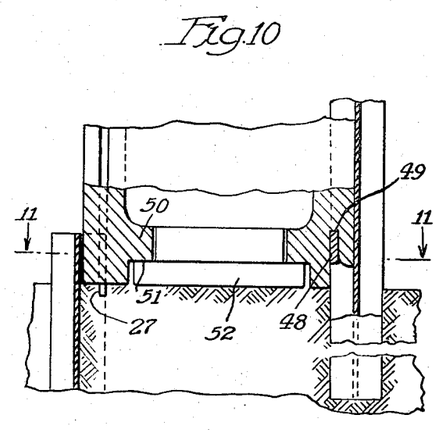
FIG. 10 is a view similar to a fragmentary portion of FIG. 6, illustrated to an enlarged scale.
Figure 11:
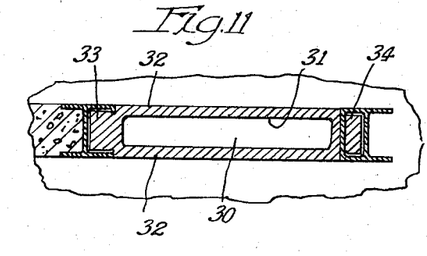
FIG. 11 is a section taken in line 11—11 of FIG. 10.
Figure 12:
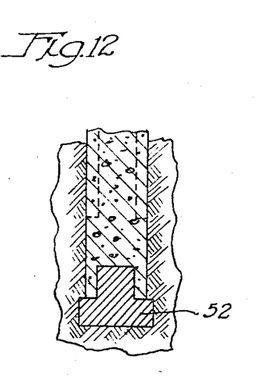
FIG. 12 is a sectional view taken in accordance with line 12—12 of FIG. 7.

In FIG. 6, fully implanted concrete wall slabs 22 are shown installed in the earth between H-beam piles 25 in the left-hand portion of the figure, and adjacent thereto, immediately to the right, a resonant elastic box form structure 30, composed of a suitable elastic material such as steel, is shown ready to be driven down (see also FIGS. 2 and 10). Assuming the wall to be built progressively toward the right, the beam 25 immediately to the left of the form 30 in FIG. 6 will already have been driven down when the form 30 and the beam 25 immediately to the right of the latter are ready to be driven, and in this practice of the invention, the latter two members are driven down together. The box-form structure 30 has a large rectangular cavity 31 to receive wet concrete, as described more fully hereinafter, the cavity (see FIG. 2) being defined by two flat side walls 32 and by two thickened edge walls 33 and 34 which interfit into the channels afforded by the adjacent H-beams 25, of which the one to the left has already been driven, and the other of which is started, but driven only a short distance down in FIG. 6. Preferably, at least one of the two flange portions 26 of the H-beam 25, which is already embedded in the ground when the box form 30 is ready to be driven, is provided at its upper end with an inwardly turned flange or rib 27 which engages loosely in a corresponding vertical guide groove 28 in the edge wall portion 34 of the form 30. In the illustrative embodiment, the box form structure 30 has at the top a horizontal integral platform 36, which projects beyond the end walls 33 and 34 on each side, as shown. It has been mentioned that, as viewed in FIG. 6, a pile 25 adjacent the left-hand edge of the form 30 has already been driven. The next pile 25 is started a short distance, by sonic or any other form of driving, and thereafter driven simultaneously with the box form 30. This pile is shown in FIG. 6 with its upper end engaged under the right-hand laterally projecting portion of the platform 36, and engaging over and interfitted with the edge wall portion 34 of the form 30, as clearly shown in FIGS. 1, 2 and 6. This H-beam pile 25 is releasably clamped to the form platform 36 as shown typically in FIG. 8. A clamp arm 40 pivotally mounted on platform 36 and operated by a hydraulic jack 45, clamps block 44 temporarily tack-welded in the upper end portion of the pile 25. Towards the bottom end of the pile 25, and preferably immediately adjacent the lower end portion of the box form 30, the pile 25 is furnished between its two flanges with a strap 48 which is engaged in a vertical notch 49 formed in the lower end portion of the form wall 33. The pile 25 and the form wall 34 are thus temporarily secured together and remain secured together for unitary vibratory action and for simultaneous sonic driving into the earth. The overhanging platform 36 transmits vibratory driving action from the upper end of the form 30 to the upper end of the pile.

In the embodiment here shown, the bottom of the box form structure 30 is formed with a bottom wall 50 containing an aperture 51 for a plug 52. The wall 50 is spaced somewhat above the lower end of the form 30, so as to form a shoulder therebelow, and the lower portion of the plug 52 is extended so as to engage under said shoulder. The plug 52 is then fitted into the aperture 51 just prior to driving, and its engagement with the earth prevents it from falling out during the driving operation.

Acoustically, the hollow box structure or form 30 comprises a resonator, and is set into resonant standing wave vibration by cyclic force pulses applied to its upper end from a presently described vibration generator or oscillator. This standing wave vibration may have, first of all, in response to a vertically oriented component of such force pulses, the general character of a half-wavelength resonant longitudinal standing wave pattern, with modifications owing to local concentrations of mass, stiffness or compliance, and with further modifications, to be described presently (owing to cross-coupling) by which substantial vibration of the broad side and edge walls takes place. Assuming a longitudinal resonant standing wave vibration pattern to be set up therein, a velocity antinode V is established at the top end of platform 36, another velocity antinode V′ is established at the lower end of the box structure, and there will be a node or a pseudonode at some intervening point such as designated at N. The vertical components of vibration of portions of the broad side and edge walls then cause lateral elastic vibratory buckling or bending of these vertically disposed side walls and edge walls of the box, so that, from a generator applying only vertical cyclic force impulses to the box, a complex pattern of box vibration is achieved, with the lower end wall or bottom of the box vibrating against the soil under it, and the large and broad vertical side walls of the box, as well as the vertical edge walls thereof, vibrating horizontally against the confronting earth material.

The lower end portion of the box structure under these conditions undergoes a vertically oriented vibratory action. With the lower end portion of the box structure resting firmly on the ground surface, the soil underneath the box structure becomes sonically coupled to the latter, and the particles of earth material vibrate randomly, are converted into a fluidized state, and flow laterally, so as to permit intrusion of the box structure. In addition, the vertical side and edge walls of the box, cross-coupled to vertically vibrating structure of the box, enter into a mode of lateral elastic vibration, and so vibrate, like a large diaphragm transducer, laterally against the soil facing it. Some of the immediately facing soil has arrived by extrusion of fluidized soil from beneath the box. This soil material contacting the laterally vibrating box walls is strongly fluidized or further fluidized by the wide vibrating vertical box walls, and so caused to further compact in the lateral direction, reducing the penetration friction, and making way for additional soil fluid which may come up from beneath the box. The earth particles are thus moved aside into a state of increased compaction, and the box structure 30 moves downwardly therethrough, the penetration taking place with striking velocity, but in all cases depending, of course, upon the particular soil materials encountered. The laterally oriented box vibration phenomenon here described is not akin to that known by the expression "Poisson's ratio," but is a higher order effect, deriving from actual elastic transverse bending of wide, vertical, box walls, which can take place with relatively large amplitude, and thus attain a desirable effect of a new and higher order than has heretofore been known.

Such vibratory action is established in the box form structure by the orbital-mass oscillator or vibration generator 60 rigidly mounted atop the box form 30, and which applies to the latter a vertically oriented component of alternating force, as heretofore mentioned, when the operating frequency of the generator approximates the frequency of the box structure for a mode of vertical, resonant, standing wave vibration. However, it is within the scope of the invention to modify the operating frequency of the generator to obtain different desirable effects including further augmentation of lateral standing wave vibration in the vertical box walls, or complex waves or vibrations in which, by cross-coupling effects, the entire box structure is set into elastic vibration. Thus a complex standing wave vibration pattern may be achieved, preferably at or near some resonant frequency of the box, at which virtually all earth contacting walls of the box are in sustained elastic vibration in directions toward and from corresponding areas of the surrounding soil. The soil is thus stirred and fluidized all around the box, large and wide-spread soil fluidity is achieved, and the box descends comparatively easily and rapidly into the soil.

It is possible that some form of oscillator 60 other than the preferred orbital-mass type might serve adequately in some cases. I strongly prefer, however, for assured attainment of straight and powerful driving, sustained through various conditions of soil encountered below the ground surface, and for automatic accommodation to the variations of soil thus encountered, that there be used some form of the orbital-mass vibration generator principle. The advantages of this type of generator or oscillator have been described fully hereinabove, and examples of such oscillators are shown in several of my prior patent applications and issued patents, as identified above. These can be consulted for further teaching, and are incorporated herein by this reference. It should therefore not be necessary to illustrate the details of such an orbital-mass oscillator herein, and it will suffice to say that such an oscillator may involve typically a cylindrical internal bearing or raceway 60a for a cylindrical rotor mass 60b which rolls around such bearing or raceway, the rotor mass comprising preferably a cylindrical roller of a diameter very approximately three-quarters of the diameter of the raceway. Through suitable gearing, as disclosed for example in my prior copending application Ser. No. 402,474, this roller may be driven from a shaft or shafts 62 coaxial with the raceway and driven by a motor or motors 64 hung from a platform 66 which is in turn suspended by a sling 67 from a hook 68 which hangs from a pulley and cable system supported by a controllable boom 70 mounted on a suitable transport vehicle 72. The motor or motors 64 can be, illustratively, induction or series-wound motors which have a characteristic of substantial inverse speed responsiveness to torque loading imposed thereon. This selection of motor drive means is made for reasons fully explained in the introductory portion of the specification. The vibratory oscillator should have its vibration isolated from the suspension means above, and for this purpose I here indicate simple spring support means at 60c.

Assume now that the pile 25 at the extreme left in FIG. 6 has been driven, a concrete wall slab 22 has been formed next to this first pile 25, and there is a second pile 25 already installed at the right-hand edge of this concrete wall slab 22. Assume further that the box form 30 is being suspended in a position somewhat above that of FIG. 6, and that the H-beam 25 at the right-hand edge of the form 30 has been locked into position. With oscillator 60 in operation at a frequency to resonate the box-form structure 30 under the drive of the motor means 64, the assembly hanging from the boom is lowered and positioned so that the lower edge portion 34 of the box structure 30 is suitably aligned with the previously driven H-beam 25 at the right-hand edge of the last placed concrete wall slab 22, while the lower end of the H-beam 25 locked to the box structure 30 is in engagement with the ground surface. Oscillator 60 is then driven at the resonant longitudinal standing wave frequency of the assembly of form 30 and said H-beam 25 and the cyclic force impulses thereby applied from the oscillator to the form 30 and H-beam 25, causing both said H-beam 25 and the box structure 30 to undergo longitudinal elastic vibratory action. The lower leg portion of said beam 25 then works downwardly into the top soil, until the lower end portion of the form 30 approaches initial ground level. The edge portion 33 of form 30 is then manipulated so as to engage properly with the left-hand H-beam 25, so that the form 30 is thereafter guided by the H-beam 25 and the flange portion 27 thereof. Upon further lowering away, the form 30 engages the ground surface, and then, with its longitudinal vibration pattern sustained, and the weight of the assembly imposed on the earth, with both the form structure 30 and the H-beam 25 undergoing longitudinal standing wave vibration the assembly then moves rapidly downward into the earth, in the manner previously described, crowding the earth granules, which are then in a state of sonic agitation, laterally to one side. This operation is continued until the bottom of the form reaches the level L, the projecting lower end portion of the pile carried by the structure 30 then being buried somewhat further, below the level L, as will be clearly understood. As fully described earlier, the oscillator should be driven at a frequency just under that for peak resonance in order to obtain certain important advantages, which need not be recounted here.

Figures 3, 4:
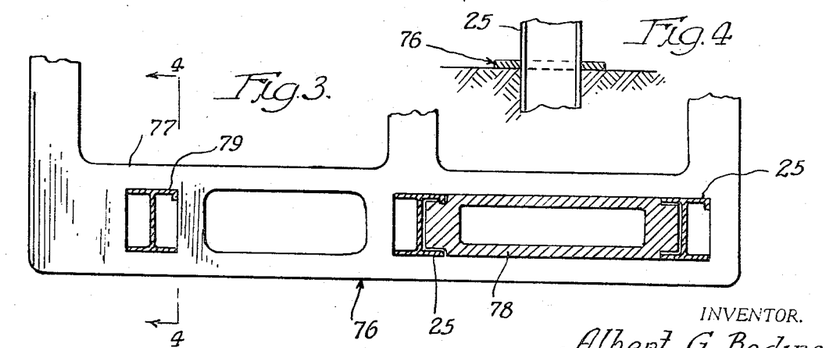
FIG. 3 is a plan view showing a template used in the process of the invention.
FIG. 4 is a section taken on line 4—4 of FIG. 3.
Figure 5:
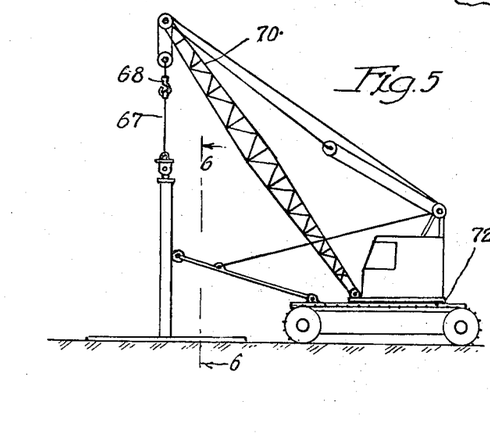
FIG. 5 is a diagrammatic view showing, in elevation, equipment used in the carrying out of the invention.

In the carrying out of this operation, it is of great advantage to employ a spacer plate or template 76 such as is illustrated in FIGS. 3 and 6. This template as shown in FIG. 3 will be seen to be designed to space the H-beam piles properly for two rows of such piles in the construction of a pair of parallel underground walls such as indicated in FIG. 1. The template comprises a flat plate 77 with suitable cut-out areas, and has an elongated slot 78 (see FIG. 3) of just the proper length to receive a pair of properly spaced H-beams 25, with a box form 30 therebetween. In line with the slot 78 there may be formed an aperture 79 adapted to receive and obtain anchorage from a previously driven pile 25. The use of this template 76 can in some cases help in guiding the straight-down driving of the form 30 and the H-beam 25 attached to one edge thereof. It is of course vital to the success of the process that the forms 30 and H-beam be driven virtually straight downwardly, with considerable uniformity, and as mentioned hereinabove, this is aided very importantly by the use of the orbital-mass oscillator in combination with the resonating action of the form itself, whereby there is accomplished a very uniform and sustained driving action in the vertical direction. With the advantage of this sonic driving system, and especially, in some cases, with the additional aid of a template such as here described, good uniformly directed driving action is obtainable.

Figure 7:
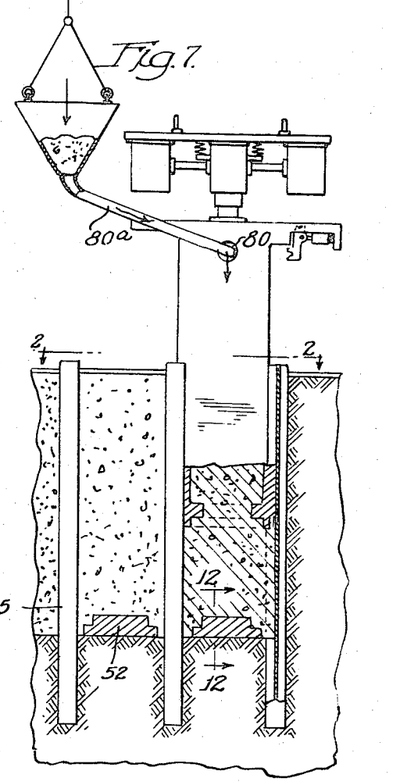
FIG. 7 is a view somewhat similar to that of FIG. 6, but showing a subsequent position in carrying out of the process.

The thickened edge portions of the form 30 are capable of moving the dirt out from between the flanges of the previously driven H-beam 25, and in the manner already described, the whole bottom end of the box structure, inclusive of course of the bottom plug 52, sonically agitate the earth to a fluidized state and result in its lateral displacement to the sides of the form structure, while the wide side walls in vibrational contact with the earth compact the earth material laterally. As earlier mentioned, this displacement is facilitated by random lateral vibratory motion of individual grains or granules of earth material, under the type of sonic resonant vibration characteristic of the invention, and the soil is thus placed in the condition such that it will receive the box-form structure with surprisingly low resistance. The box form 30, having thus formed a space into which a concrete wall slab is to be cast in place, is then detached from the pile 25 which was driven with it, and moved upwardly. The pile can be detached from the form 30 by release of pressure in the hydraulic jack 45, and then striking the clamp block 44 with a hammer, sufficient to break the tack weld thereof to the H-beam. Thereafter, the suspension means for platform 66 is pulled upwardly by the cable system, making use of a winding drum, not illustrated, if desired. The oscillator 60 is again driven, as before, and under these conditions, the form 30 is pulled out of the ground. While so doing, wet concrete is introduced into the form 30 through a port 80 by means of a hose 80a, as illustrated in FIG. 7. The concrete fills in the hollow space 31 inside the form and is extruded out the lower end thereof, the plug 52 being dislodged by the concrete and remaining at the bottom. This performance is illustrated in FIG. 7.

In this operation of discharge of concrete from the form structure 30 into the cavity left by the elevating form, the concrete is discharged under sonic agitation, owing to the vibratory action of the form 30. It is thus forced into the cavity space below the form under oscillating pressure and thus caused to become well compacted. In addition, the lower end portion of the form 30 vibrates against the discharged concrete, and thus introduces further sonic agitation into the body of discharged concrete, thereby gaining further highly useful vibratory compaction of the concrete. The form 30 may in fact be slowly withdrawn, in order that there will be assurance of fully filling the cavity and fully compacting it by the vibratory reciprocation action of the lower end of the form.

This procedure can be repeated over and over, extending the wall as far as desired.

In any case in which the joints between the concrete wall slabs so formed and the H-beams are not as fluid-tight as desired, or where complete sealing is essential, grout may be introduced into these joints under pressure. In anticipation of this operation, perforated delivery tubes, not shown, may be initially installed within the channels of the H-beams.

Reference is next directed to FIGS. 13–16, showing an alternative form of the invention. In this case, the system and process are much like that illustrated in FIGS. 1–12, but here the form initially contains a precast concrete wall slab, which is sent down into the ground along with the form, and the form then sonically extracted, leaving the wall slab in position, and grout introduced to fill in the spaces between the introduced slab and the piles or pillars. The latter again may be of the H-beam type, exactly, if desired, as in FIGS. 1–12. In FIGS. 13–16, the H-beams are designated at 25a, and the form at 30a. The oscillator 60a, which may be like the oscillator 60 described earlier, is mounted atop the form 30a, and is driven by motor means, and suspended for vertical movement by gearing, all substantially as heretofore typically described in connection with FIGS. 1–12.

The form 30a of the embodiment of FIGS. 13–16 has its interior hollow or cavity 31a extending through the top thereof, and the top of the form 30a has in this case two oppositely projecting platform flanges 81, to which is demountably secured a base plate or platform 82 for the oscillator 60a. Thus, with the form in the position of FIG. 13, for example, the base plate 82, oscillator 60a and the balance of the equipment above can be separated from the form 30a, and a precast concrete slab 84 at that time introduced into the form 30a. This being done, the oscillator can be recoupled to the form 30a, and the operation proceeds, with the only difference being that the precast concrete slab 84 is now inside the form 30a, and travels downwardly with the latter. The concrete slab 84 can be prestressed, and thus capable of participating in the vibratory action. Primarily, however, the resonant vibratory action is set up in the form 30a, and the slab 84 contributes primarily to the operation by the desirable imposition of its weight on the earth material below. This bias weight is beneficial in that it is conducive to the necessary lateral compaction of the soil which must be displaced by the form.

When the form with the concrete precast slab contained therein has been fully driven to depth, the suspension gear for the equipment can be pulled upward, with the oscillator still in operation, leaving the concrete slab in place. It will be noted that to this end, the plug 52a at the bottom of the form has in this case been enlarged and all upwardly facing shoulders in the cavity 31a eliminated. Accordingly, the slab 84 stays down when the form 30a is pulled upwardly. Vibration of the form during the upward trip facilitates the removal thereof, as in the first case described.

Figures 13, 14, 15, 16, 19, 20:
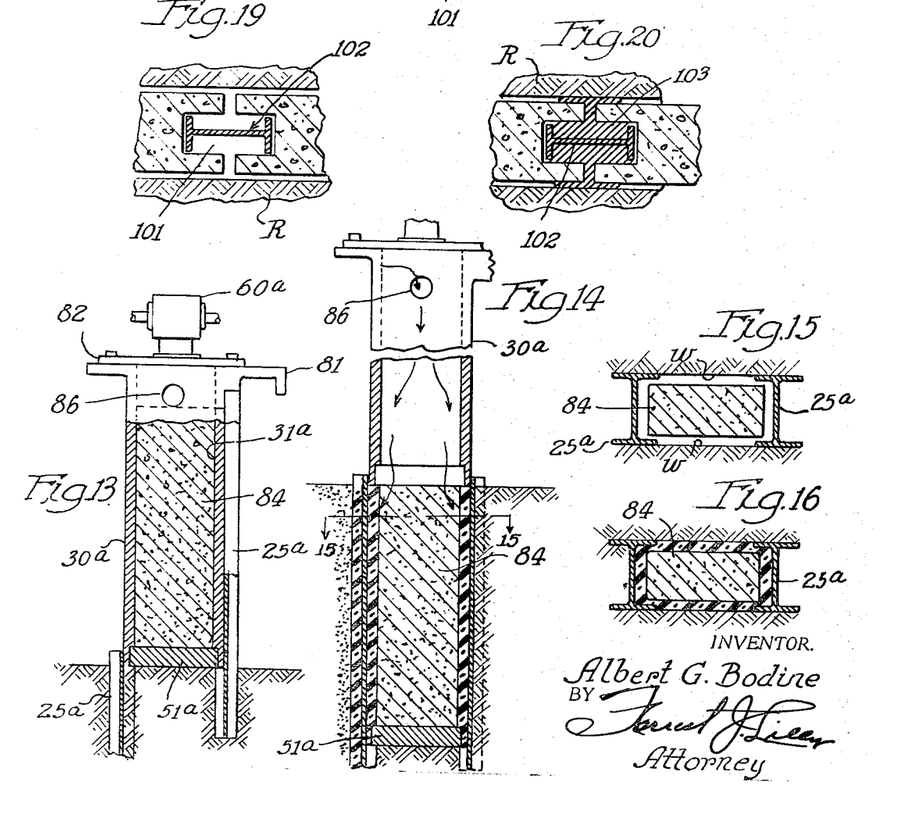

Removal of the form 30a of course opens up a substantial space between the concrete slab 84, the adjacent H-beams 25a and the side walls w of the shaft in the earth which was made by the penetration of the form (FIG. 15). This space can be filled in with a suitable grout during the removal of the form. Thus, a grout delivery hose may be passed through a port 86 in the upper end of the form 30a, and introduction of grout can be begun when the form 30a has been pulled upwardly, as to the position shown in FIG. 14. The grout thus may be introduced while the form remains still at least partially within the earth shaft, and permits filling in of grout, as at 89, with the concrete slab remaining in centered position. If desired, some additional centering means can be inserted from the top just as the form 30a is removed.

A further variant of the process, using apparatus like that shown in FIGS. 13–16, is first to drive the form 30a, without a precast concrete slab therein, more or less as in the process as described in connection with FIGS. 1–12. Then, when the form has been driven to depth, the platform 82, oscillator 60a, and equipment above, are removed, and a concrete slab, such as the slab 84, then inserted into the form. The oscillator is then reconnected, operated to vibrate the form, and the process then completed by extracting the form and filling in with grout, as just above described.

Still another variant, using apparatus such as shown in FIGS. 13–16, is to drive the form to depth, then remove it, leaving a cavity in the space just occupied by the form, and then to fill this cavity, between the adjacent H-beams, with concrete. This variation of the process is feasible where the soil constituency is such as to permit extraction of the form, preferably by sonic means, without serious cave-in of the earth walls.

Reference is next directed to FIGS. 17–20, showing another variant of the invention. In this case, a box form structure is again used, of the same general nature as the box form structure 30 of the embodiment of FIGS. 1–12, or with a removable top as in FIG. 13, assuming a precast slab is to be used, and this box form structure has at the top an oscillator, driving means, and lowering and raising equipment all of which may be of the nature shown in and described in connection with FIGS. 1–12, or 13. In this case, however, the box forms are driven first, the concrete implanted, the steadying piles or pillars thereafter driven, and finally, the joints may be filled with grout.

Since the equipment for the process of FIGS. 17–20 is so nearly like that of FIGS. 1–13, only horizontal cross-sectional views are used to illustrate the embodiment of FIGS. 17–20, and reference may be had to FIGS. 1–12, or 13, for an understanding of the balance of the equipment used in the practice of the invention illustrated by FIGS. 17–20.

Figures 17, 18:
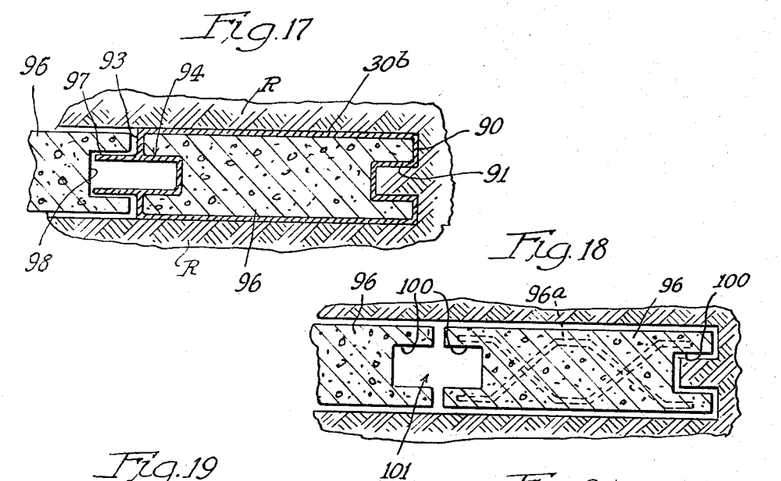
FIG. 17 is a horizontal section through an alternative embodiment of wall form member.
FIG. 18 is a view similar to FIG. 17, but showing the wall form member extracted.

In FIG. 17, the box form is designated generally at 30b, already implanted in the ground R, and this box form 30b is formed in one vertical edge wall 90 with an indentation or groove 91, and has in the other edge wall 93 a U-shaped form or channel 94, preferably of rectangular section, the outer half of which projects outwardly from wall 93, and the closed half of which lies inwardly of wall 93. The groove and channel formations 91 and 94 will be understood to extend from the upper portion of the form 30b to the bottom thereof. During driving of the form, the bottom of the form, as well as the bottom of the channel 94, may be closed with plugs, not illustrated, which will drop out and which can be left in the ground when the form 30a is extracted.

With reference to FIG. 17, an implanted concrete wall section or slab is designated generally at 96, at the left of the figure, and it is assumed that the box form 30b is then to be driven. The projecting flanges 97 of the channel 94 are interfitted into the groove 98 in the adjacent edge of the previously implanted slab 96, and the form 30b is then driven to depth, using sonic means and procedures as described hereinabove. A precast concrete slab 96, preferably with steel rods 96a therein, is then, after removal of the oscillator and the top of the form 30b (using apparatus as in FIG. 13), introduced into the form, and the top of the oscillator then reclosed, and the oscillator and equipment above reconnected. Alternatively, the slab 96 may be introduced into the form before the latter is driven into the ground. In any event, the form 30b is then extracted, with the oscillator in operation, or in other words, with the aid of sonic vibration.

The appearance is then, in horizontal section, as in FIG. 18. The concrete wall slab 96 is initially formed with notches 100 in opposite ends thereof, in conformity with the end configuration of the form 30b. The end notches 100 of contiguous slabs are then opposed to one another, as seen in FIG. 18, leaving a rectangular space 101 between the edges of the wall sections, and this rectangular space will be understood to extend from top to bottom of each wall section 99. An H-beam pile or pillar 102 is then driven downwardly into this space 101 (see FIG. 19), and is preferably buried in the ground below the lower level of the wall to be formed, such as to a level approximately as represented in FIG. 6 for the H-beams 25.

Grout under pressure is then introduced down in to the joints between wall sections, i.e., into the space 101, filling in all around the H-beam 102 as represented at 103 in FIG. 20. This grout is preferably also introduced in sufficient quantity to extrude out through the spaces between the adjacent wall sections and also into the space between the wall sections and the vertical walls of the earth R into which the wall is being installed.

The procedure described in connection with FIGS. 17–20 results in the implanting of a strong, underground wall, with especially good sealing at the joints between wall sections.

Reference is next directed to FIGS. 21–28, inclusive, showing still another sonic process in accordance with the invention for implanting an underground concrete wall.

Figure 21:
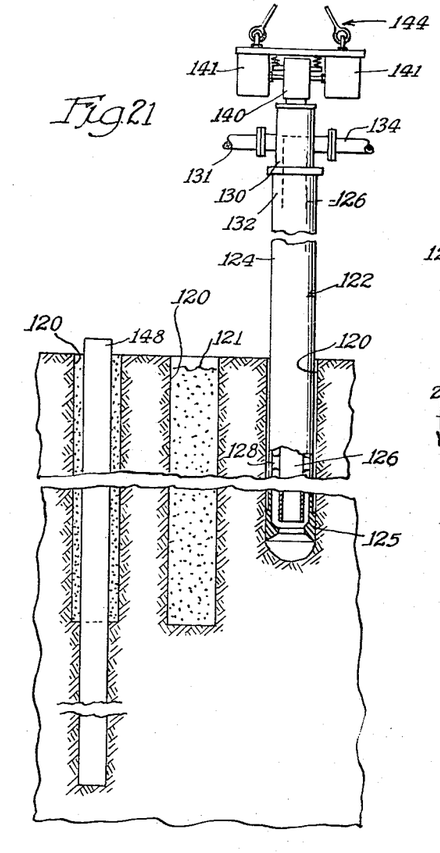
FIG. 21 is a view partially in section and partly in elevation, showing an alternative practice of the invention.

In the middle portion of FIG. 21, there is shown a bore 120 extending downwardly to a predetermined depth in the ground, the distance down to the bottom of the bore being the intended depth of the wall to be implanted. Preferably, and as indicated in FIG. 21, the bore 120 contains a suitable slurry, such as bentonite, as indicated at 121.

To the right of the middle bore 120, another such bore is shown as being drilled by a sonic boring tool 122. The tool 122 comprises an outer elastic steel pipe 124, with a somewhat enlarged drive shoe 125 on the lower end thereof, together with an inner pipe 126 annularly spaced inside the outer pipe 124, and connected to the latter at suitable places by means of webs such as indicated at 128. Connected to the top end of the tool 122 is a circulation head 130, having an inlet 131 which communicates with the annular space 132 between the outer and inner pipes 124 and 126, head 130 has also an outlet 134 which communicates with the closed upper end of the inner pipe 126.

On the top of the circulation head 130 is mounted a vibration generator or oscillator 140, again preferably of the orbital-mass type as referred to hereinabove, and the oscillator 140 is driven as by motor means 141 hung from a platform 142 and suspension means generally designated at 144 and housing equipment above, not shown.

The sonic boring tool 122 may operate generally in the manner of my sonic pile driver, such as shown in Patent No. 2,975,846, but with penetration of the tool into the ground additionally facilitated by use of bentonite slurry to flush out earth material while driving. Thus, the bentonite is circulated in through inlet 131, down the annulus 132, to the bottom of the bore, and then passes upward through the inside tube 126 to be delivered via outlet 134. Briefly, the oscillator 140 is driven by motor means 141 at a frequency such as will apply to the upper end of the circulation head 130 and pipe 124 a vertical component of alternating force such that it will set up in the pipe 124 a half-wavelength resonant longitudinally oriented standing wave. The shoe 125 on the lower end of the pipe 124 then vibrates vertically at this frequency, and with circulation established as described above the bore is easily made. It will of course be understood that the bore being made by the tool 122 in FIG. 21 will be taken down to the level of the aforementioned bore 120. It should also be mentioned that the bores 120 are made on predetermined centers. After drilling of the bores 120, the drilling tools 122 are extracted by taking an upward pull thereon through the suspension means 144, the oscillator 140 being preferably operated at this time so as to continue the vibratory action and thus facilitate extraction.

FIG. 21 shows, in the left-hand part thereof, an H-beam 148 (see also FIG. 23), which has been driven down to the bottom end of the bore 120, and then on down a desired number of feet deeper, sufficient to assure ultimate wall stability. As will be noted in FIG. 23, as well as in FIG. 24, the H-beams 148 are preferably dimensioned such that the edge portions of the flanges thereof intercept and are supported by the walls of the bore 120.

The beams 148 of course drive easily down to the depth of the lower ends of the bores 120, but below such depth, harder driving is required. The beams 148 are accordingly preferably driven down by pile driving equipment and techniques such as disclosed in my aforementioned Patent No. 2,975,846. As diagrammatically indicated in phantom lines in the right-hand portion of FIG. 22, such a pile driving equipment may comprise a clamp 150 clamped to the upper extremity of the H-beam 148, an orbital-mass oscillator 151 mounted on the top of the clamp 150, drive motor means 152 for the oscillator 151, and lowering and hoisting means designated generally at 154.

Figure 22:
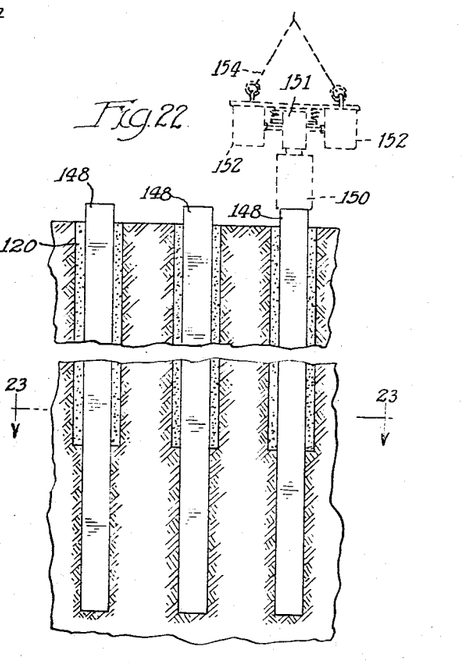
FIG. 22 is a view generally similar to FIG. 1, but showing a subsequent stage in the process.
Figure 23:
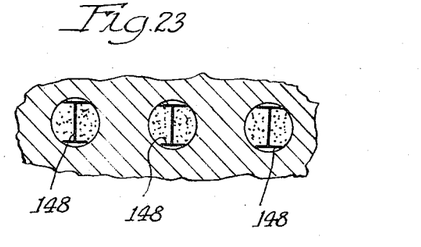
FIG. 23 is a section taken on line 23—23 of FIG. 22.

FIGS. 22 and 23 show three of the H-beams 148 driven vertically, as described, on predetermined centers.

Between each adjacent pair of H-beams 148, there is then driven downwardly into the soil, to a predetermined depth of the wall to be formed, a double-H beam or form 160. This form 160, which is composed of steel, and therefore of good elastic properties, has two parallel side walls 162, interconnected by two spaced transverse walls 163, so as to form, in effect, when interfitted with the H-beams 148, three parallel cells 164, 165 and 166.

Figure 25:
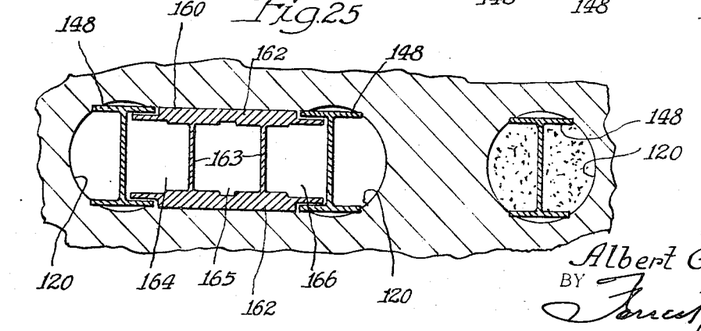
FIG. 25 is a section taken on line 25—25.

As shown, the walls 162 are dimensioned and configured to be receivable within the facing channels of the H-beams 148, all as will be entirely clear from FIG. 25.

In a typical installation, the bores 120 may be approximately twenty-four inches in diameter, and it can be appreciated that the driving of the wide beam 160 through the earth intervening between the bores 120 requires substantial drive effort. The invention uses for this purpose a sonic driving system such as heretofore described in connection with FIGS. 1–12. The side walls 162 of the beam 160 are tapered upwardly at the top, as at 167, and mounted thereon is an orbital-mass type oscillator 168, such as the oscillator 60 of FIG. 6. This oscillator 168 is driven from motor means such as 169, mounted on a platform 170 which is suspended from raising and lowering equipment above, only fragmentarily shown in FIG. 24, but which will be understood to be characteristically like that described in connection with FIG. 6.

The double-H box form 160 is interfitted with the flanges of a pair of adjacent H-beams 148, as indicated in FIG. 25, and is then driven downwardly by oscillator 168, driven by motor means 169 at a resonant longitudinal standing wave frequency of the form 160, or at any frequency for a desirable complex vibration pattern found effective. Cross-coupling again results in lateral elastic vibration of the side walls of the form when a longitudinal standing wave is set up along the beam. Although not essential to the practice of the invention, I have shown in the drawings a fluid jet assist feature. A fluid inlet to the interior of the form 160 is indicated at 171, and this inlet 171 feeds ducts such as 172, which discharge fluid downwardly to aid in loosening the earth material.

Figure 24:
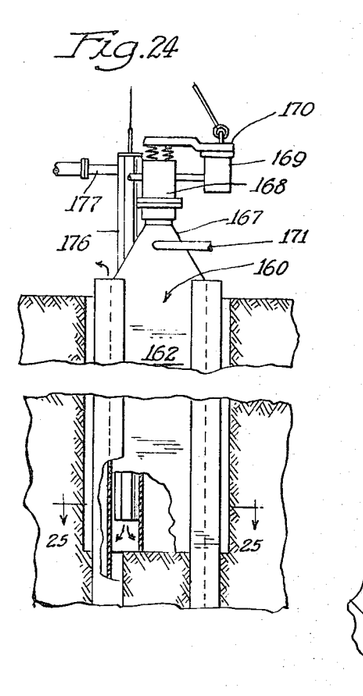
FIG. 24 is a view, partly in elevation and partly in section, showing a wall form member driven into the ground between two of the H-beam piles of FIGS. 22 and 23.

Accordingly, the form 160 is driven to depth, as to the position shown in FIG. 24. Earth material trapped within the several cells of the form 160 is then washed out by inserting in these cells, one after the other, a wash-out probe or pipe 176, and introducing thereinto, through inlet 177, any suitable wash-out fluid. This fluid issues from the lower end of the pipe 176 and travels up around the outside thereof, through the cell of the form, and out of the upper end, as clearly indicated in FIG. 24.

Figure 26:
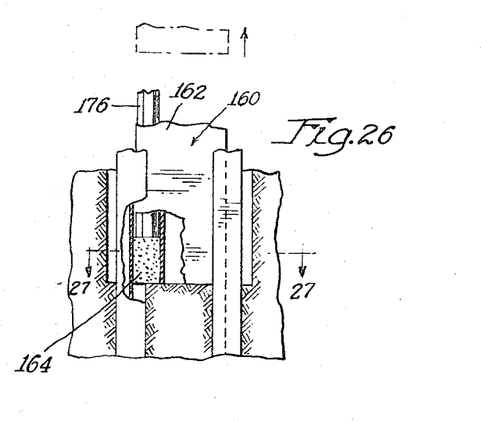
FIG. 26 is a view similar to a portion of FIG. 24, illustrative of the concrete filling-in stage of the process.
Figure 27:
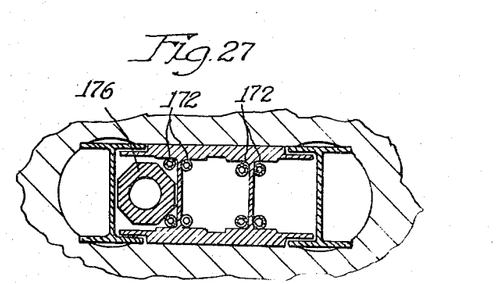
FIG. 27 is a section taken on line 27—27 of FIG. 26.
Figure 28:
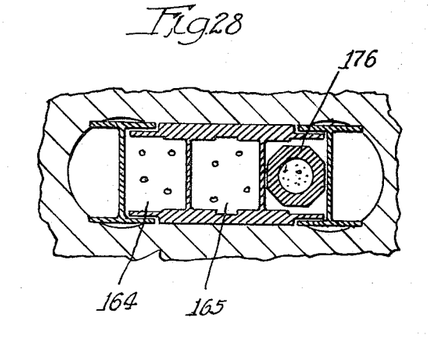
FIG. 28 is a view similar to FIG. 27, but showing two of the cells already filled in with concrete, and the concrete introduction probe in position to fill the third of the cells.

Concrete is then introduced into the three cells, preferably one after the other, and for this purpose I preferably utilize the probe 176 (FIG. 26), sending the concrete down therethrough from a suitable source of supply. In FIG. 26, the probe 176 is shown as introducing concrete into the cell 164. In FIG. 28, the cells 164 and 165 are indicated as filled with concrete, while the remaining cell has the probe 176 therein, and illustrates the operation of introducing the concrete.

To introduce the concrete into the middle cell 165, it will be evident, of course, that the oscillator 165 must be temporarily removed and swung aside.

When the concrete is in place, the form 160 is pulled back upward out of the ground, using for this purpose, preferably, the oscillator 168 to establish vibration in the form, while taking an upward pull with the suspension means above.

Figure 29:
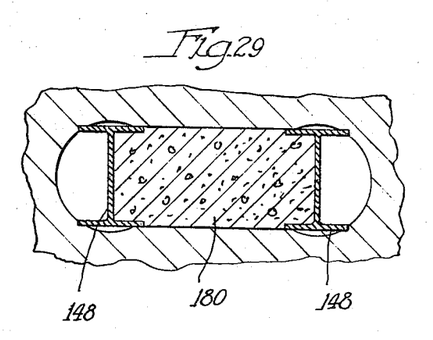
FIG. 29 is a view similar to FIG. 28, but with the form 160 extracted and a finished concrete wall slab or section 180 implanted in the earth in place thereof.

FIG. 29 shows the complete concrete wall 180, installed between the two adjacent H-beams 148, and it will be clear that the wall may be extended horizontally in this manner as far as desired.

Reference is next made to FIGS. 31–34, inclusive, showing a substantially modified form of the invention, wherein the concrete wall form or forming member is mover horizontally rather than vertically through the earth.

Numeral 200 designates a vehicle propelled by a crawler 201 and having a frame generally designated at 202 which mounts an engine 204 and suitable accommodations for an operator. The frame 202 also includes a pair of A-frame structures 206 for the support of certain members to be later mentioned.

Pivotally connected on horizontal axes, as at 208, to the frame member 202, outside the crawlers 201, is a trailing unit generally designated at 210, and which comprises, first, a U-frame structure 212, whose extremities are at the aforementioned pivots 208, and from whose transverse member 213 projects, in the rearward direction, a pair of closer spaced side frame members 215. The latter are supported by gound-engaging trailing wheels 216. A pair of hydraulic jacks 220 pivotally connected to the upper portions of A-frames 206 have their plunger rods 221 pivotally connected, as at 222, to the transverse member 213, and the entire trailing frame structure 210, and parts connected thereto, can be swung from the position illustrated in FIG. 30, by means of the hydraulic jacks 220, into an upper position in which all of the below-ground equipment is swung to an upper carrying position, in good clearance with the ground level L.

Between the side members 215, and shortly forwardly of the rear wheels 216, there is a vertically elongated form 230, of generally U-shape in cross-section.

Figures 30, 31, 32, 33, 34:
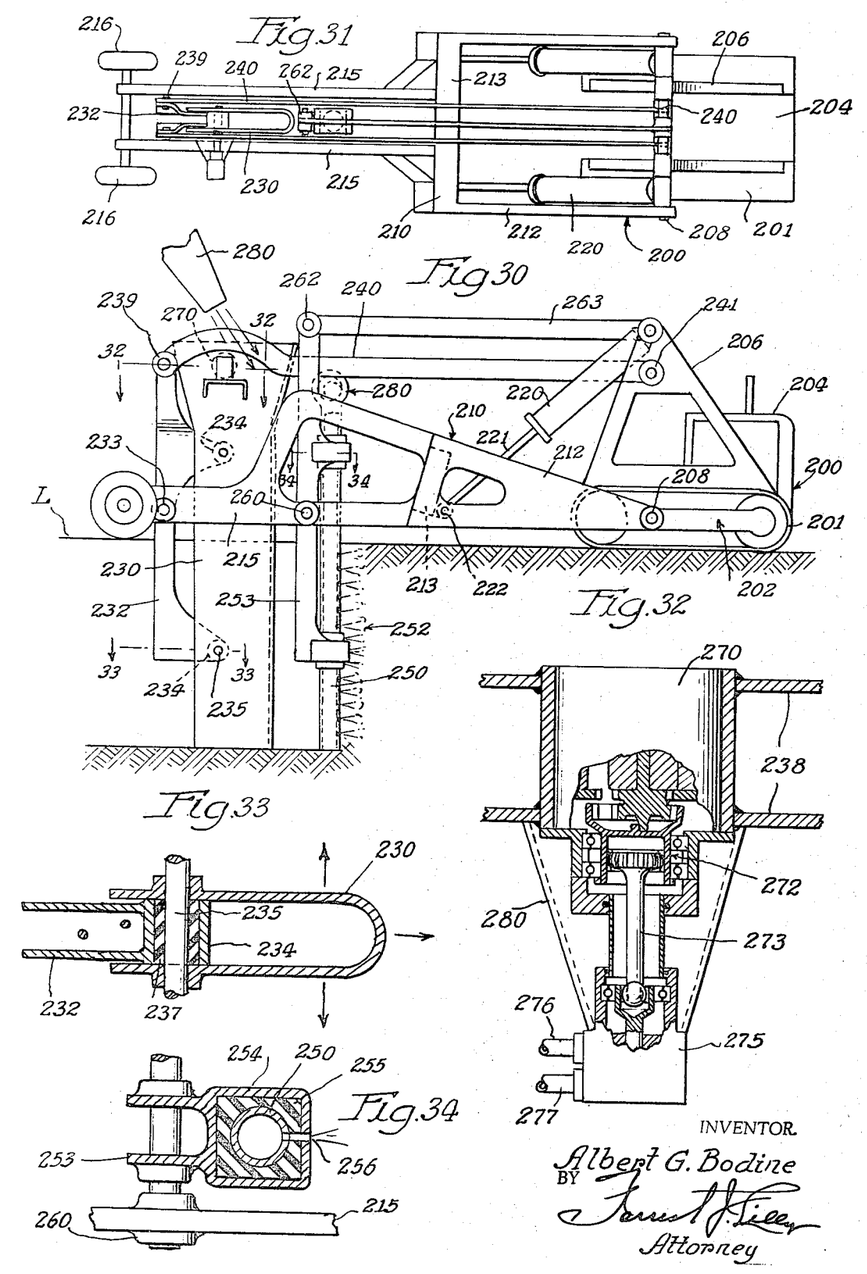
FIG. 30 is a view partly in elevation and partly in section, showing an alternative embodiment and practice of the invention, contrived in this instance for forming the concrete wall continuously by a horizontally progressive operation.
FIG. 31 is a plan view of the apparatus shown in FIG. 30.
FIG. 32 is a section taken on line 32—32 of FIG. 30.
FIG. 33 is a section taken on line 33—33 of FIG. 30.
FIG. 34 is a section taken on line 34—34 of FIG. 30.

Behind the form 230 is a vertical mounting beam 232 therefor, and this beam is pivotally mounted on and between the side members 215, as at 233, and has two mounting hubs 234 (FIG. 33) which reach in between the side walls of the U-form 230 to surround mounting pins 235 set in said walls, with rubber sleeves 237 intervening between the pins 235 and the hubs 234 for vibration absorbing purposes. The two hubs 234 mount the beam 232 at two vertically spaced points of the latter, located generally twenty to twenty-three percent, or thereabouts, from the extremities of the form 230. Assuming a lateral resonant standing wave of one wave-length to be set up in the form 230, as later described, these mounting points are in the regions of velocity nodes of the standing wave, and are thus points of minimized vibration, suitable for mounting purposes. The upper extremities of the two walls of mounting beam 232 are flared apart somewhat, as seen in FIG. 31, and pivotally connected thereto, as at 239, are a pair of forwardly reaching links 240 whose opposite ends are pivotally connected, as at 241, to the A-frame members 206. Thus, when the frame unit 210 is swung upwardly about the pivot mounting 208 on the vehicle frame 202, the U-form 230 and its mounting beam 232 will swing upwardly accordingly to clear the form 230 from the ground.

The embodiment of FIGS. 31–34 will work its way laterally through the ground without further aid, by virtue of the ability of a resonating sonically vibratory member to fluidize and move earth material. To facilitate and improve the speed of the operation, I may use, ahead of the U-form, an additional vertically disposed vibratory bar 250, which may be designed for resonant standing wave vibration in order to form the original trench, and may also be aided by having fluid delivered therethrough and jetted forwardly from orifices in its forward side, as represented generally at 252.

The bar or pipe 250 is a steel, elastic member, adapted to be set into standing wave vibration, preferably in the lateral mode, in a full wavelength pattern, and to this end, the bar 250 is mounted at its two nodal points, for a full-wavelength standing wave, on a support beam 253 immediately to the rear thereof. As indicated in FIG. 34, the beam 253 may be formed at the mounting points with boxes 254 which surround rubber vibration absorbing blocks 255, with the latter in turn hugging the vertically extending vibratory bar or pipe 250. The pipe, which is furnished with liquid under pressure, preferably water, from any suitable source, not shown, delivers liquid forwardly therefrom through orifices such as 256. The supporting beam 252 is pivtotally mounted on the side members 215 as at 260, and to its upper end is pivotally connected, as at 262, the rearward end of a link 263 connected at the forward end thereof to the A-frame means 206.

The lateral standing wave mentioned above to be set up in the form 230 is generated by an orbital-mass type of oscillator designated generally at 270, set into the upper portion of the U-form 230 between the two sides thereof, as seen clearly in FIG. 32. The oscillator 270 is again of a type wherein an orbital mass of cylindrical form runs around the inside of a cylindrical raceway in an orbital path, and may be, for example, the type of oscillator shown in FIGS. 9–12, inclusive, in my copending application Ser. No. 402,474, filed Oct. 8, 1964, and allowed Aug. 22, 1966. For the details of such an oscillator, said application may be consulted, and the subject matter thereof is incorporated herein by this reference. As shown in said application, the oscillator is driven, through certain gearing generally designated at 272, and the drive shaft 273, from a motor means 275, and in this case, this motor means may be of a hydraulic type, having inlet and outlet lines 276 and 277, respectively, for delivery of fluid under controlled pressure. The motor means 275 is shown as mounted on the side wall of the U-form 230 as by support means 280. Control of pressure to the inlet 276 of course determines the speed and frequency of the oscillator 270, and control is thus established so as to deliver a cyclic impulse from the oscillator 270 at the lateral one-wavelength standing wave frequency of the form 230. The oscillator 270 is located at a velocity antinode of the standing wave desired, and when operated at the resonant frequency, a standing wave is developed in the member 230 in the lateral mode, one full wavelength long, with velocity antinodes at the two extremities, and at the midpoint, and with the usual intervening velocity nodes.

This standing wave action in the form 230, in the case wherein the form 230 engages directly against the earth in a suitable preformed trench, is effective to fluidize the earth material and cause it to flow laterally, so as to make way for the continuously forwardly traveling form 230. During such travel, concrete may be poured into the form from above, as from the chute 281, and the concrete wall thus continuously formed. It may be mentioned in passing that it is quite easy to insert iron reinforcing bars downwardly into the concrete while the latter is still wet, and a stronger wall thus constructed. These may be driven in, if desired, using sonic driving techniques like those which I employ for driving of the piles.

To improve the speed of the process, I may use the additionally described vibratory member 250, which is provided at its upper extremity with an orbital-mass type of vibration generator, generally designated at 282, and which may be of any of the types heretofore mentioned. The details of this generator are omitted since these may be modified at will with the teaching now at hand. Accordingly, by driving the oscillator 282 at a lateral full-wavelength standing wave frequency for the bar 250, the latter is set into lateral standing wave vibration at a resonant frequency, and the sonic wave vibratory agitation of the bar 250 against the soil has a fluidizing effect thereon, giving the particles thereof a high mobility such as causes them to move aside and make way for the bar. In addition, when the fluid jet action is applied, the soil is further fluidized, washed from the wall against which the member 250 is advancing and the member 250 thus moves readily forward, extending the trench in the forward direction. The washed away soils tends to a large extent to be crowded and compressed laterally in the event that the fluid jetting action is not used, and with fluid jetting action, the resulting slurry tends additionally to move around the member 250 to the space between the latter and the oncoming form 230. The form 230 thus moves easily forwardly through whatever earth material is encountered in the trench space to the rear of the vibratory member 250. As before, wet concrete is introduced into the form 230 from the discharge means 281 as the form moves ahead under power of the vehicle 200. A concrete wall can thus be made in the ground, at the width of the form 230, and can be built progressively as the machine travels forwardly.

The invention has now been described in a number of illustrative forms, but it will be understood that these are for illustrative purposes only, and that various additional procedures and alternative forms of equipment may be employed without departing from the spirit and scope of the invention.

I claim:

1. The process of implanting a concrete wall below ground level in the earth, that comprises:

lowering into pressural engagement with a surface of the ground an elastic, hollow, box-structure wall form, having substantially vertical side walls, of pronounced width, and substantially vertical edge walls of a dimension substantially equal to the thickness of the wall to be implanted;

causing a rotor means to travel orbitally about a bearing means at a frequency in the range of resonance for a pattern of standing wave vibration in said wall form;

applying an inertial cyclic force of reaction so developed at said bearing means to said wall form to set up in said wall form a pattern of resonant elastic standing wave vibration, so as to sonically vibrate and mobilize the material of the earth underneath and in contact with said resonantly vibrating form, whereby said wall form penetrates into the ground and forms a wall space therein;

elevating said wall form from said wall space while simultaneously both setting up a pattern of resonant elastic standing wave vibration in said form by means of said rotor means and installing concrete in said wall space.

2. The method of claim 1, including applying said cyclic force of reaction to the upper end portion of said box and thence through the structure of the box to said vertical side walls so as to develop horizontal elastic vibratory bending of said side walls against the material of the earth in contact therewith.

3. The subject matter of claim 1, including the step of preliminarily driving a vertical guiding and stabilizing pile into the ground, to a depth greater than the predetermined depth of the wall to be implanted, and guiding a vertical edge of said wall form by means of said pile while said wall form is penetrating the ground.

4. The subject matter of claim 3, including the further step of preliminarily temporarily attaching a pile to the opposite vertical edge of said wall form, with a portion of said last mentioned pile projecting downwardly below the lower end of the wall form, whereby said last mentioned pile penetrates the ground along with said wall form; and detaching said wall form from said last mentioned pile prior to elevation of said wall form.

5. The subject matter of claim 1, including preliminarily driving a pair of guiding and stabilizing piles into the ground, at a horizontal spacing to closely accommodate said wall form between them, and to a depth greater than the predetermined depth of the wall to be implanted; and guiding the vertical edges of said wall form by means of said piles while said wall form is penetrating the ground.

6. The process of succesively inserting in the ground two walls forms according to the process of claim 1, with the edges thereof opposed to one another, and thereafter driving a stabilizing pile into the ground between said edges.

7. The subject matter of claim 6, including the step of introducing grout into the remaining space between said edges and around said pile.

8. The subject matter of claim 1, including the step of introducing wet concrete through said wall form to said wall space while said form is being elevated from said wall space.

9. The subject matter of claim 8, including the step of setting up said resonant standing wave vibration in said wall form while said wall form is being elevated from said wall space;

introducing wet concrete through said wall form to said wall space while said form is being elevated from said wall space; and establishing a rate of introduction of said wet concrete to said wall space such that it fills in up to the level of the bottom of said vibrating wall form during said elevation of said wall form, in such manner that said vibrating wall form acts against said concrete to cyclically impact it into said wall space.

10. The subject matter of claim 1, including the step of introducing a precast concrete wall slab into said wall form while said form is in said wall space; and thereafter elevating said wall form from said wall space around the outside of said wall slab, so as to leave said slab in the ground.

11. The subject matter of claim 1, including the step of introducing a precast concrete well slab into said wall form prior to penetration of said wall form into the ground, whereby said wall form and slab penetrate the ground together; and thereafter elevating said wall form from said wall space around the outside of said wall slab, so as to leave said slab in the ground.

12. The subject matter of claim 1, including the step of introducing wet concrete into said wall form after said wall form has penetrated the ground; and thereafter elevating said wall form from said wall space while said wet concrete therein flows from said wall form into said wall space.

References Cited

UNITED STATES PATENTS

| | | | |
|---|---|---|---|
| 4,048,252 | 7/1936 | Frankignoul | 61—53.62 |
| 2,975,846 | 3/1961 | Bodine | 175—19 |
| 3,187,513 | 6/1965 | Guild | 61—53.5 |

FOREIGN PATENTS

| | | |
|---|---|---|
| 1,267,692 | 6/1961 | France. |
| 304,325 | 3/1955 | Switzerland. |

JACOB SHAPIRO, *Primary Examiner.*

U.S. Cl. X.R.

61—39, 49, 53.5, 53.52, 53.66; 175—19, 56: 173—49